United States Patent
Helitzer et al.

(10) Patent No.: US 9,311,676 B2
(45) Date of Patent: Apr. 12, 2016

(54) SYSTEMS AND METHODS FOR ANALYZING SENSOR DATA

(75) Inventors: Jonathan A. Helitzer, Simsbury, CT (US); Joseph R. Carvalko, Jr., Milford, CT (US); Kelly L. Frey, Sr., Nashville, TN (US); G. Stewart Murchie, West Hartford, CT (US); Susannah Chen, West Hartford, CT (US); Steven Rippel, Newington, CT (US); Casey Ellen Campbell, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1361 days.

(21) Appl. No.: 11/894,049

(22) Filed: Aug. 16, 2007

(65) Prior Publication Data

US 2008/0065427 A1 Mar. 13, 2008

Related U.S. Application Data

(63) Continuation-in-part of application No. 10/655,804, filed on Sep. 4, 2003, now Pat. No. 7,610,210.

(51) Int. Cl.
*G06Q 40/00* (2012.01)
*G06Q 40/08* (2012.01)
(Continued)

(52) U.S. Cl.
CPC ............... *G06Q 40/08* (2013.01); *G06Q 50/22* (2013.01); *G06F 17/60* (2013.01)

(58) Field of Classification Search
CPC ....... G06Q 40/08; G06Q 10/10; G06Q 40/02; G06Q 30/06; G06Q 10/02; G06Q 30/0283; G06Q 20/127; G06Q 10/06; G06Q 20/105; G06Q 20/28; G06Q 20/343; G06Q 30/02; G06Q 40/025; G06Q 10/0637; G06Q 20/32
USPC .............................................................. 705/4
See application file for complete search history.

(56) References Cited

U.S. PATENT DOCUMENTS 4,667,336 A 5/1987 Best et al.
4,975,840 A 12/1990 DeTore et al.
(Continued)

FOREIGN PATENT DOCUMENTS

EP 0155779 A1 9/1985
EP 1160707 12/2001
(Continued)

OTHER PUBLICATIONS

Lyashuk, Oksana. Testing for Evidence of Adverse Selection in Developing Automobile Insurance Market. Diss. National University, 2007. p. 1-54.*

(Continued)

*Primary Examiner* — Jamie Swartz
(74) *Attorney, Agent, or Firm* — Howard IP Law Group, PC

(57) ABSTRACT

The invention relates to systems and methods for analyzing data collected from sensors monitoring property. In particular, the systems and methods analyze the data to make property insurance underwriting decisions based on the collected sensor data using a computerized process that varies the way in which it manipulates the collected sensor data based on a characteristic of the property being insured, a characteristic of the entity seeking the insurance, and/or on the value of one or more collected data parameters. The invention also relates to systems and methods of making property insurance pricing decisions based on a similarly dynamic computerized process.

43 Claims, 6 Drawing Sheets

(51) Int. Cl.
*G06Q 50/22* (2012.01)
*G06F 17/00* (2006.01)

(56) References Cited

U.S. PATENT DOCUMENTS

| | | | |
|---|---|---|---|
| 5,613,072 A | 3/1997 | Hammond et al. | |
| 5,635,693 A | 6/1997 | Benson et al. | |
| 5,680,329 A | 10/1997 | Lloyd et al. | |
| 5,712,984 A | 1/1998 | Hammond et al. | |
| 5,794,216 A | 8/1998 | Brown | |
| 5,796,932 A | 8/1998 | Fox et al. | |
| 5,797,134 A * | 8/1998 | McMillan | G06Q 30/0283 705/4 |
| 5,825,283 A | 10/1998 | Camhi | |
| 5,842,148 A | 11/1998 | Prendergast et al. | |
| 5,873,066 A | 2/1999 | Underwood et al. | |
| 5,926,800 A | 7/1999 | Baronowski et al. | |
| 5,950,150 A | 9/1999 | Lloyd et al. | |
| 5,970,464 A | 10/1999 | Apte et al. | |
| 6,014,632 A | 1/2000 | Gamble et al. | |
| 6,064,970 A * | 5/2000 | McMillan et al. | 705/4 |
| 6,067,488 A | 5/2000 | Tano | |
| 6,078,857 A | 6/2000 | Jung et al. | |
| 6,112,225 A | 8/2000 | Kraft et al. | |
| 6,154,658 A | 11/2000 | Caci | |
| 6,163,277 A | 12/2000 | Gehlot | |
| 6,163,770 A | 12/2000 | Gamble et al. | |
| 6,182,048 B1 | 1/2001 | Osborn et al. | |
| 6,204,757 B1 | 3/2001 | Evans et al. | |
| 6,211,777 B1 | 4/2001 | Greenwood et al. | |
| 6,223,125 B1 | 4/2001 | Hall | |
| 6,246,934 B1 | 6/2001 | Otake et al. | |
| 6,307,965 B1 | 10/2001 | Aggarwal et al. | |
| 6,317,718 B1 | 11/2001 | Fano | |
| 6,389,340 B1 | 5/2002 | Rayner | |
| 6,502,020 B2 | 12/2002 | Lang | |
| 6,563,423 B2 | 5/2003 | Smith | |
| 6,583,734 B2 | 6/2003 | Bates et al. | |
| 6,594,579 B1 | 7/2003 | Lowrey et al. | |
| 6,611,740 B2 | 8/2003 | Lowrey et al. | |
| 6,633,820 B2 | 10/2003 | Bizar | |
| 6,636,790 B1 | 10/2003 | Lightner et al. | |
| 6,643,578 B2 | 11/2003 | Levine | |
| 6,684,189 B1 | 1/2004 | Ryan et al. | |
| 6,710,738 B2 | 3/2004 | Allen, Jr. | |
| 6,732,031 B1 | 5/2004 | Lightner et al. | |
| 6,735,525 B1 | 5/2004 | Murphy | |
| 6,754,485 B1 | 6/2004 | Obradovich et al. | |
| 6,756,915 B2 | 6/2004 | Choi | |
| 6,767,330 B2 | 7/2004 | Lavery et al. | |
| 6,768,417 B2 | 7/2004 | Kuragaki et al. | |
| 6,795,759 B2 | 9/2004 | Doyle | |
| 6,823,258 B2 | 11/2004 | Ukai et al. | |
| 6,832,141 B2 | 12/2004 | Skeen et al. | |
| 6,839,305 B2 | 1/2005 | Perlman et al. | |
| 6,853,956 B2 | 2/2005 | Ballard, Jr. et al. | |
| 6,868,339 B2 | 3/2005 | Murphy et al. | |
| 6,868,386 B1 * | 3/2005 | Henderson et al. | 705/4 |
| 6,871,199 B1 | 3/2005 | Binnig et al. | |
| 6,917,952 B1 | 7/2005 | Dailey et al. | |
| 6,920,379 B2 | 7/2005 | Miyamoto | |
| 6,925,425 B2 | 8/2005 | Remboski et al. | |
| 6,931,309 B2 | 8/2005 | Phelan et al. | |
| 6,957,133 B1 | 10/2005 | Hunt et al. | |
| 6,965,326 B2 | 11/2005 | Allison | |
| 6,968,453 B2 | 11/2005 | Doyle et al. | |
| 6,973,319 B2 | 12/2005 | Ormson | |
| 6,977,612 B1 | 12/2005 | Bennett | |
| 6,985,922 B1 | 1/2006 | Bashen et al. | |
| 6,987,964 B2 | 1/2006 | Obradovich et al. | |
| 7,017,142 B1 | 3/2006 | Ehnebuske et al. | |
| 7,039,592 B1 | 5/2006 | Yegge et al. | |
| 7,069,118 B2 | 6/2006 | Coletrane et al. | |
| 7,072,841 B1 | 7/2006 | Pednault | |
| 7,114,376 B2 | 10/2006 | Loucks et al. | |
| 7,215,255 B2 | 5/2007 | Grush | |
| 7,240,213 B1 | 7/2007 | Ritter | |
| 7,343,306 B1 | 3/2008 | Bates et al. | |
| 7,346,525 B1 | 3/2008 | Milanovich | |
| 7,363,308 B2 | 4/2008 | Dillon et al. | |
| 2001/0039509 A1 | 11/2001 | Dar et al. | |
| 2001/0042024 A1 | 11/2001 | Rogers | |
| 2001/0044733 A1 | 11/2001 | Lee et al. | |
| 2002/0002475 A1 | 1/2002 | Freedman et al. | |
| 2002/0010601 A1 | 1/2002 | Taylor | |
| 2002/0013717 A1 | 1/2002 | Ando et al. | |
| 2002/0052765 A1 | 5/2002 | Taylor | |
| 2002/0055861 A1 | 5/2002 | King et al. | |
| 2002/0055903 A1 | 5/2002 | Solomon | |
| 2002/0072958 A1 | 6/2002 | Yuyama et al. | |
| 2002/0087364 A1 | 7/2002 | Lerner et al. | |
| 2002/0091550 A1 | 7/2002 | White et al. | |
| 2002/0099596 A1 | 7/2002 | Geraghty | |
| 2002/0103622 A1 | 8/2002 | Burge | |
| 2002/0111725 A1 | 8/2002 | Burge | |
| 2002/0115423 A1 | 8/2002 | Hatae et al. | |
| 2002/0116228 A1 | 8/2002 | Bauer et al. | |
| 2002/0128882 A1 * | 9/2002 | Nakagawa | G06Q 30/02 705/4 |
| 2002/0145666 A1 | 10/2002 | Scaman et al. | |
| 2002/0147617 A1 | 10/2002 | Schoenbaum et al. | |
| 2002/0161609 A1 * | 10/2002 | Zizzamia et al. | 705/4 |
| 2002/0165739 A1 | 11/2002 | Guyan et al. | |
| 2002/0173885 A1 | 11/2002 | Lowrey et al. | |
| 2002/0178033 A1 * | 11/2002 | Yoshioka | G06Q 40/08 705/4 |
| 2002/0194033 A1 * | 12/2002 | Huff | 705/4 |
| 2002/0194113 A1 | 12/2002 | Lof et al. | |
| 2002/0198801 A1 | 12/2002 | Dixon et al. | |
| 2003/0009357 A1 | 1/2003 | Pish | |
| 2003/0028406 A1 | 2/2003 | Herz et al. | |
| 2003/0033057 A1 | 2/2003 | Kallestad | |
| 2003/0040934 A1 | 2/2003 | Skidmore et al. | |
| 2003/0061075 A1 | 3/2003 | Heckman et al. | |
| 2003/0088562 A1 | 5/2003 | Dillon et al. | |
| 2003/0093366 A1 | 5/2003 | Halper et al. | |
| 2003/0101080 A1 | 5/2003 | Zizzamia et al. | |
| 2003/0105651 A1 | 6/2003 | Gendelman | |
| 2003/0135395 A1 | 7/2003 | Carfi et al. | |
| 2003/0154009 A1 | 8/2003 | Basir et al. | |
| 2003/0158751 A1 | 8/2003 | Suresh et al. | |
| 2003/0158758 A1 | 8/2003 | Kanazawa et al. | |
| 2003/0171956 A1 | 9/2003 | Cox et al. | |
| 2003/0187702 A1 | 10/2003 | Bonissone et al. | |
| 2003/0187704 A1 | 10/2003 | Hashiguchi et al. | |
| 2003/0221118 A1 | 11/2003 | Walker | |
| 2003/0229522 A1 | 12/2003 | Thompson et al. | |
| 2003/0233261 A1 | 12/2003 | Kawahara et al. | |
| 2003/0233278 A1 | 12/2003 | Marshall | |
| 2003/0233323 A1 | 12/2003 | Bilski et al. | |
| 2004/0036601 A1 | 2/2004 | Obradovich | |
| 2004/0039586 A1 | 2/2004 | Garvey et al. | |
| 2004/0039611 A1 | 2/2004 | Hong et al. | |
| 2004/0103002 A1 | 5/2004 | Colley et al. | |
| 2004/0117217 A1 | 6/2004 | Reber et al. | |
| 2004/0138927 A1 | 7/2004 | Eydeland et al. | |
| 2004/0139034 A1 | 7/2004 | Farmer | |
| 2004/0148201 A1 | 7/2004 | Smith et al. | |
| 2004/0153362 A1 | 8/2004 | Bauer et al. | |
| 2004/0153762 A1 | 8/2004 | Flynn et al. | |
| 2004/0181495 A1 | 9/2004 | Grush | |
| 2004/0186753 A1 | 9/2004 | Kim et al. | |
| 2004/0199410 A1 | 10/2004 | Feyen et al. | |
| 2004/0215494 A1 | 10/2004 | Wahlbin et al. | |
| 2004/0220784 A1 | 11/2004 | Stephenson et al. | |
| 2004/0220837 A1 | 11/2004 | Bonissone et al. | |
| 2004/0220838 A1 | 11/2004 | Bonissone et al. | |
| 2004/0220839 A1 | 11/2004 | Bonissone et al. | |
| 2004/0220840 A1 | 11/2004 | Bonissone et al. | |
| 2004/0225535 A1 | 11/2004 | Bond et al. | |
| 2004/0236596 A1 | 11/2004 | Chowdhary et al. | |
| 2004/0236611 A1 | 11/2004 | Bonissone et al. | |
| 2004/0236676 A1 | 11/2004 | Takezawa et al. | |
| 2004/0243450 A1 | 12/2004 | Bernard et al. | |

(56) References Cited

U.S. PATENT DOCUMENTS

| | | |
|---|---|---|
| 2004/0249557 A1 | 12/2004 | Harrington et al. |
| 2004/0249679 A1 | 12/2004 | Henderson et al. |
| 2004/0260579 A1 | 12/2004 | Tremiti |
| 2004/0267577 A1 | 12/2004 | Nakai |
| 2005/0021360 A1 | 1/2005 | Miller et al. |
| 2005/0038682 A1 | 2/2005 | Gandee et al. |
| 2005/0055248 A1 | 3/2005 | Helitzer et al. |
| 2005/0055249 A1 | 3/2005 | Helitzer et al. |
| 2005/0060141 A1 | 3/2005 | Suzuki et al. |
| 2005/0060207 A1 | 3/2005 | Weidner et al. |
| 2005/0065682 A1 | 3/2005 | Kapadia et al. |
| 2005/0070299 A1 | 3/2005 | Caspi et al. |
| 2005/0071202 A1 | 3/2005 | Kendrick |
| 2005/0075067 A1 | 4/2005 | Lawson et al. |
| 2005/0086084 A1 | 4/2005 | Dillard |
| 2005/0091085 A1 | 4/2005 | Colley et al. |
| 2005/0091175 A9 | 4/2005 | Farmer |
| 2005/0102172 A1 | 5/2005 | Sirmans |
| 2005/0108063 A1 | 5/2005 | Madill et al. |
| 2005/0108065 A1 | 5/2005 | Dorfstatter |
| 2005/0108066 A1 | 5/2005 | Weidner et al. |
| 2005/0125259 A1 | 6/2005 | Annappindi |
| 2005/0131742 A1 | 6/2005 | Hoffman et al. |
| 2005/0137912 A1 | 6/2005 | Rao et al. |
| 2005/0171885 A1 | 8/2005 | Christman et al. |
| 2005/0174217 A1 | 8/2005 | Basir et al. |
| 2005/0192730 A1 | 9/2005 | Churchill et al. |
| 2005/0216583 A1 | 9/2005 | Cole et al. |
| 2005/0222867 A1 | 10/2005 | Underwood et al. |
| 2005/0228692 A1 | 10/2005 | Hodgdon |
| 2005/0234742 A1 | 10/2005 | Hodgdon |
| 2005/0240451 A1 | 10/2005 | Johnson et al. |
| 2005/0276401 A1 | 12/2005 | Madill et al. |
| 2005/0278082 A1 | 12/2005 | Weekes |
| 2005/0285748 A1 | 12/2005 | Pedraza et al. |
| 2006/0000420 A1 | 1/2006 | Davies |
| 2006/0009289 A1 | 1/2006 | McCarten et al. |
| 2006/0015253 A1 | 1/2006 | Ochs et al. |
| 2006/0015360 A1 | 1/2006 | Ochs et al. |
| 2006/0015373 A1 | 1/2006 | Cuypers |
| 2006/0015374 A1 | 1/2006 | Ochs et al. |
| 2006/0033625 A1 | 2/2006 | Johnson et al. |
| 2006/0036473 A1 | 2/2006 | Taylor |
| 2006/0053038 A1* | 3/2006 | Warren et al. ............... 705/4 |
| 2006/0064332 A1 | 3/2006 | Schoenbaum et al. |
| 2006/0136273 A1 | 6/2006 | Zizzamia et al. |
| 2006/0165040 A1 | 7/2006 | Rathod et al. |
| 2006/0187889 A1 | 8/2006 | Mehta et al. |
| 2006/0232398 A1 | 10/2006 | Nedblake et al. |
| 2006/0242046 A1 | 10/2006 | Haggerty et al. |
| 2006/0259333 A1* | 11/2006 | Pyburn et al. ............... 705/4 |
| 2006/0287892 A1 | 12/2006 | Jones et al. |
| 2007/0005404 A1* | 1/2007 | Raz et al. ............... 705/4 |
| 2007/0016500 A1 | 1/2007 | Chatterji et al. |
| 2007/0016508 A1 | 1/2007 | Lapointe et al. |
| 2007/0021987 A1 | 1/2007 | Binns et al. |
| 2007/0027726 A1 | 2/2007 | Warren et al. |
| 2007/0043656 A1 | 2/2007 | Lancaster |
| 2007/0043662 A1 | 2/2007 | Lancaster |
| 2007/0073748 A1 | 3/2007 | Barney |
| 2007/0106539 A1 | 5/2007 | Gay |
| 2007/0174082 A1 | 7/2007 | Singh |

FOREIGN PATENT DOCUMENTS

| | | |
|---|---|---|
| EP | 1241599 | 9/2002 |
| EP | 1145163 | 5/2003 |
| EP | 1313043 | 5/2003 |
| EP | 1544771 | 6/2005 |
| EP | 1583013 | 10/2005 |
| JP | 2001118175 | 4/2001 |
| JP | 2001319051 | 11/2001 |
| JP | 2002092764 | 3/2002 |
| JP | 2002109229 | 4/2002 |
| JP | 2002133117 | 5/2002 |
| JP | 2002183456 | 6/2002 |
| JP | 2002329071 | 11/2002 |
| JP | 2002373259 | 12/2002 |
| JP | 2004013234 | 1/2004 |
| JP | 2004017901 | 1/2004 |
| JP | 2004059013 | 2/2004 |
| JP | 2004078393 | 3/2004 |
| JP | 2004240688 | 8/2004 |
| JP | 20031319051 A | 11/2011 |
| WO | WO-99/21116 | 4/1999 |
| WO | WO-01/11501 | 2/2001 |
| WO | WO-01/63445 | 8/2001 |
| WO | WO-01/63534 | 8/2001 |
| WO | WO-03/058381 | 7/2003 |
| WO | WO-03/065268 | 8/2003 |
| WO | WO-03/090130 | 10/2003 |
| WO | WO-2004/100043 | 11/2004 |

OTHER PUBLICATIONS

Saito, Kuniyoshi. Does Less Risk Classification Induce more Adverse Selection? Evidence from Automobile Insurance Market. mimeo, University of Tokyo, 2003. p. 1-25.*

Lyashuk, Oksana. Testing for Evidence of Adverse Selection in Developing Automobile Insurance Market. Diss. National University, May 2007. p. 1-54.*

Riegel et al. Insurance Principles and Practices, Prentice-Hall, Inc. pp. i-xi (1921).

Butler et al. Driver Record: A Political Red Herring That Reveals the Basic Flaw in Automobile Insurance Pricing. J. of Insurance Regulation. 8:2, 200-234 (1989).

Office Action dated Apr. 2, 2008 for U.S. Appl. No. 10/655,804.

German, J. Portable structure tester may bring better-built homes, shopping malls, skyscrapers. Sandia Lab News. 51:2. Jan. 29, 1999. [Retrieved on Jan. 23, 2008]. Retrieved from Internet URL: <http://www.sandia.gov/LabNews/LN01-29-99/aser_story.htm>.

Office Action dated Feb. 12, 2008 for U.S. Appl. No. 10/656,479.

Nerad, Jack. Insurance by the mile. (Dec. 22, 2004) Retrieved from http://www.drivers.com.

Johnston, J. Vehicle's Black Box Holds Key to Crash (May 21, 2003). Retrieved from http://news.tbo.com.

Litman, T. Distance-Based Vehicle Insurance Feasibility, Costs and Benefits. Comprehensive Technical Report). Victoria Transport Policy Institute. (Jul. 8, 2004).

The Lowdown Ways to Reduce the Premium on Homeowner's Insurance; [Diana McCabe. Chicago Tribune. Chicago, IL: Aug. 25, 2000. p. 28 [Retrieved from Internet Apr. 27, 2007].

Gallagher, C. Risk Classification Aided by New Software Tool. National Underwriter. 17, p. 19. 1992.

Dorn et al. Insurance Industry Databases. Database. 21:5, 68-71. (1998).

Apte et al. Business Applications of Data Mining. Communications of the CAM. 45:8, 49-53. (2002).

Apte et al. Insurance Risk Modeling Using Data Mining Technology. Research Report RC21314 (94531). (1999).

IrisNet: The 'Seeing' Internet. Retrieved from www.intel.com (2005).

D'Arcy, Stephen P. Paper presented at World Risk and Insurance Economics Congress. Predictive Modeling in Automobile Insurance: A Preliminary Analysis. (2005).

Derrig et al. Comparison of Methods and Software for Modeling Nonlinear Dependencies: A Fraud Application. (2006).

Grimes, Seth. The Word on Text Mining. Presentation. Portals, Collaboration, and Content Management. (Apr. 14, 2005).

Pednault et al. IBM Research Report RC-21757. The Importance of Estimation Errors in Cost-Sensitive Learning. (May 30, 2000).

Rosenberg et al. Predicting Modeling with Longitudinal Data: A Case Study of Wisconsin Nursing Homes. (Feb. 4, 2006).

Wang, Wei. Thesis. Predictive Modeling Based on Classification and Pattern Matching Methods. (May 1999).

Hong, S.J. et al. IBM Research Report RC-21570. Advances in Predictive Model Generation for Data Mining. (1999).

(56) References Cited

OTHER PUBLICATIONS

Woodfield, Terry J. Paper 071-30. Predicting Workers' Compensation Insurance Fraud Using SAS® Enterprise Miner™ 5.1 and SAS® Text Miner. 2004.
Pednault et al. IBM Research Report RC-21731. Handling Imbalanced Data Sets in Insurance Risk Modeling. (Mar. 10, 2000).
Woodfield, Terry J. Paper 13-26. Predictive Modeling in the Insurance Industry Using SAS Software.
Muller, Stacey. Predictive Modeling: Using Claims Data to Find Trends and Cost Drivers. Milliman Consultant's Corner.
Axelrod et al. Predictive Modeling in Health Plans. Abstract from Disease Management & Health Outcomes, 11:779-87(9). (Nov. 2003).
Wu et al. Paper. Casualty Actuarial Society Forum. pp. 113-138. Does Credit Score Really Explain Insurance Losses? Multivariate Analysis from a Data Mining Point of View. 2003.
Conger et al. Emphasis Apr. 2006. Predictive Modeling in Workers Compensation. pp. 18-21.
Apte et al. Data-intensive analytics for predictive modeling. IBM Journal of Research and Development. 47:1, 17-23 (Jan. 2003).
Apte et al. A probabilistic estimation framework for predictive modeling analytics. IBM Systems Journal. 41:3, 438-48. (2002).
Deloitte & Touche. Advanced analytics and the art of underwriting: Transforming the insurance industry.
Francis Analytics and Actuarial Data Mining. Predictive Modeling Workshop presentation: Training for development and deployment.
Magnify Press Release. Magnify Applies Predictive Modeling to Worker's Comp Underwriting and Fraud Detection. Chicago, IL (Mar. 1, 2005).
Mosley, R. The Use of Predictive Modeling in the Insurance Industry. Pinnacle Actuarial Resources Inc. (Jan. 2005).
Rosella Data Mining & Database Analytics. Downloaded from www.roselladb.com/insurance-risk-analysis.htm.
Guszcza et al. Predictive Modeling for Property-Casualty Insurance. Presentation to SoCal Actuarial Club. (Sep. 22, 2004).
Ellingsworth et al. DM Review. Text Mining Improves Business Intelligence and Predictive Modeling in Insurance. (Jul. 2003).
Insurance Newscast Press Release. "Predictive Modeling Raises Opportunities and Issues for Actuaries and Insurers, CAS Meeting is Told." (Dec. 15, 2005).
Magnify Press Release. Erie Insurance Reduces Fraud Losses with FraudFocus™. Predictive Modeling Demonstrates Effectiveness for Auto, Property and Worker's Comp. (Feb. 4, 2005).
Table of Contents of White Paper. Predictive Modeling in Insurance: An insurance industry executive briefing. SAS (Predictive Modeling in Insurance), publisher. (Mar. 23, 2007).
Rosella Data Mining & Predictive Analytics. Predicting Modeling Software. Downloaded from www.roselladb.com/predictive-modeling.htm.
Guven, Serhat. Predictive Modeling. Future Fellows. (Jun. 2006).
Predictive Modeling Applications. Weyuker, L. & Minnich, J. RECORD, 31:2. New Orleans Health/Pension Spring Meeting, Session 3PD. (Jun. 2005).
Predictive Modeling-Curernt Practices and Future Applications. RECORD, 30:1. Spring Meeting, Anaheim, CA. Session 64PD. (May 2004).
Predictive Modeling. RECORD, 28:2. Spring Meeting, San Francisco, CA. Session 99OF. (Jun. 2002).
Antonio et al. North American Actuarial Journal. 10:1, 30-48. Lognormal Mixed Models for Reported Claims Reserves. (Jan. 2006).
Young, Virginia R. Actuarial Research Clearing House. vol. 1. Robust Bayesian Credibility Using Semiparametric Models. (1999).
Macleod et al. Paper. Entropy-Reducing Properties of Predictive Financial Models. Aug. 27, 1992. Actuarial Research Clearing House. vol. 3 (1993).
Morgan et al. Conjugate Bayesian Analysis of the Negative Binomial Distribution. Actuarial Research Clearing House. vol. 1, pp. 97-118, (1993).
Sharp, Keith P. Aspects of Interest Rate Models. Actuarial Research Clearing House. vol. 1, pp. 433-457. (Aug. 25, 1990).
Roudebush et al. Converting Clinical Literature to an Insured Population: A Comparison of Models Using NHANES. No. Amen. Actuarial J. 6:4, 55-66. (2002).
Fellingham et al. Comparing Credibility Estimates of Health Insurance Claims Costs. No. Amen. Actuarial J. 9:1, 1-12. (2005).
de Alba, Enrique. Bayesian Estimation of Outstanding Claims Reserves. No. Ameri. Actuarial J. 6:4, 1-20. (2002).
Ellis et al. Applying Diagnosis-Based Predictive Models to Group Underwriting. Society of Actuaries, Issue 46, 1-7. (Aug. 2003).
Wolak, Dan. An Actuarial Response to the Health-Care Crisis. Society of Actuaries. Issue 47, 1-9. (Apr. 2004).
Werner et al. GLM Basic Modeling: Avoiding Common Pitfalls. Casualty Actuarial Society Forum. pp. 257-272. (Winter 2007).
Meyers, Glenn. On Predictive Modeling for Claim Severity. Casualty Actuarial Society Forum. pp. 215-253. (Spring 2005).
CAS Data Management and Information Educational Materials Working Party. Survey of Data Management and Data Quality Texts. Casualty Actuarial Society Forum, pp. 273-306. (Winter 2007).
Sanche et al. Variable Reduction for Predictive Modeling with Clustering. Casualty Actuarial Society Forum, pp. 89-100. (Winter 2006).
Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).
Woodley et al. Assessing Predictive Modeling Tools for Pricing and Underwriting. Health Watch. Issue 51, pp. 30-33. (Jan. 2006).
Fetterolf, Don. Paradise Lost: Return on Investment in Disease Management. Health Watch. Issue 52, pp. 14-17. (May 2006).
Stehno, Chris E. What We Have Learned in the Last 50 Years—and Aren't Using. Health Watch. Issue 52, pp. 18-21. (May 2006).
Roberts, Gregory. Seattle Post-Intelligencer. Drive less during rush hour, get a lower insurance rate. (Mar. 27, 2007).
Wenzel, T. Analysis of National Pay-As-You-Drive Insurance Systems and Other Variable Driving Charges. Lawrence Berkeley Lab., Univ. of Calif. (Jul. 1995).
Vickrey, William. Automobile Accidents, Tort Law, Externalities, and Insurance: An Economist's Critique. Orig. pub. in Law and Contemporary Problems, 33:464-87 (1968).
AIG Auto Insurance Launches GPS Based Teen Driver Pilot Program. (Apr. 9, 2007).
Chittim, G. Insure as you drive. KING5 News for Seattle. (Mar. 27, 2007).
Steed, Judy. Winning Ways. Toronto Star, p. 3-4 (May 21, 2007).
Final Office Action dated Oct. 5, 2007 for U.S. Appl. No. 10/656,479.
"California One Step Closer to Pay-As-You-Drive", retrieved from the internet on Dec. 31, 2009 at www.carinsurancelist.com/news-pay-as-you-go . . . .
Proposition 103, California Department of Insurance, retrieved from the internet on Dec. 31, 2009 at www.insurance.ca.gov/.../prop-103.cfm.
Final Office Action dated Jan. 11, 2010 in U.S. Appl. No. 11/903,927.
Final Office Action dated Jan. 7, 2010 in U.S. Appl. No. 11/642,330.
McGinty, Bill, "Protecting teenage drivers from themselves", 10Connects.com, Tampa Bay's 10 News. (Sep. 23, 2006), 1 Page.
Rejda, Principles of Insurance, Longman Higher Education, 3rd ed., p. 230, May 1989.
Tkach, Daniel S. Information Mining with the IBM Intelligent Miner Family. (An IBM Software Solutions White Paper) (Feb. 1998), 29 pages.
Popowich, Fred. Using Text Mining and Natural Language Processing for Health Care Claims Processing. SIGKDD Explorations. 7:1, 59-66 (Jun. 2005).
Phua, C. et al. A Comprehensive Survey of Data Mining-based Fraud Detection Research. (Sep. 2, 2005), 14 pages.
Francis, Louise A. Taming Text: An Introduction to Text Mining. Casualty Actuarial Society Forum. pp. 51-88 (Winter 2006).
Derrig, R. et al. Distinguishing the Forest from the TREES: A Comparison of Tree Based Data Mining Methods. Casualty Actuarial Society Forum. pp. 1-49 (Winter 2006).

\* cited by examiner

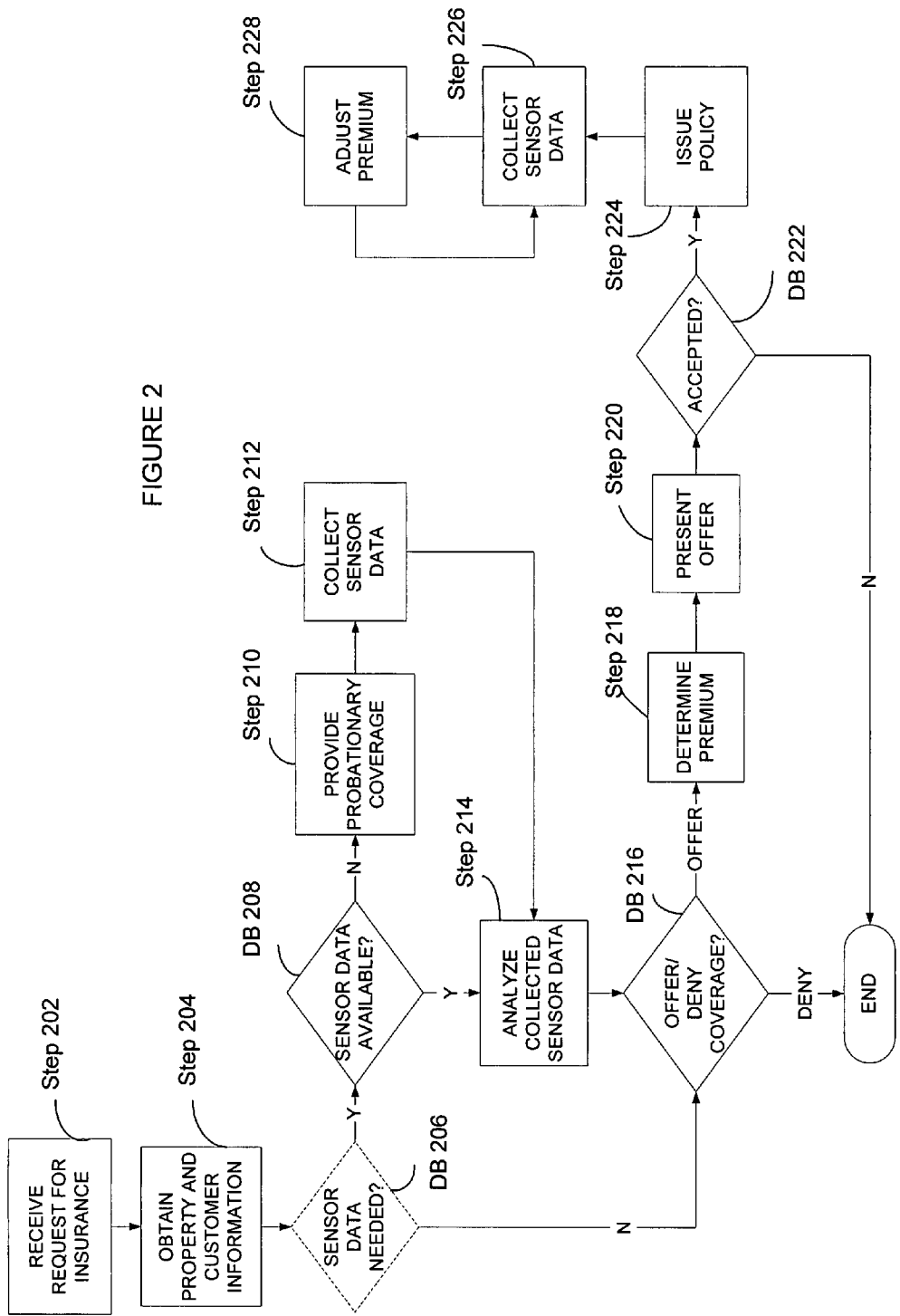

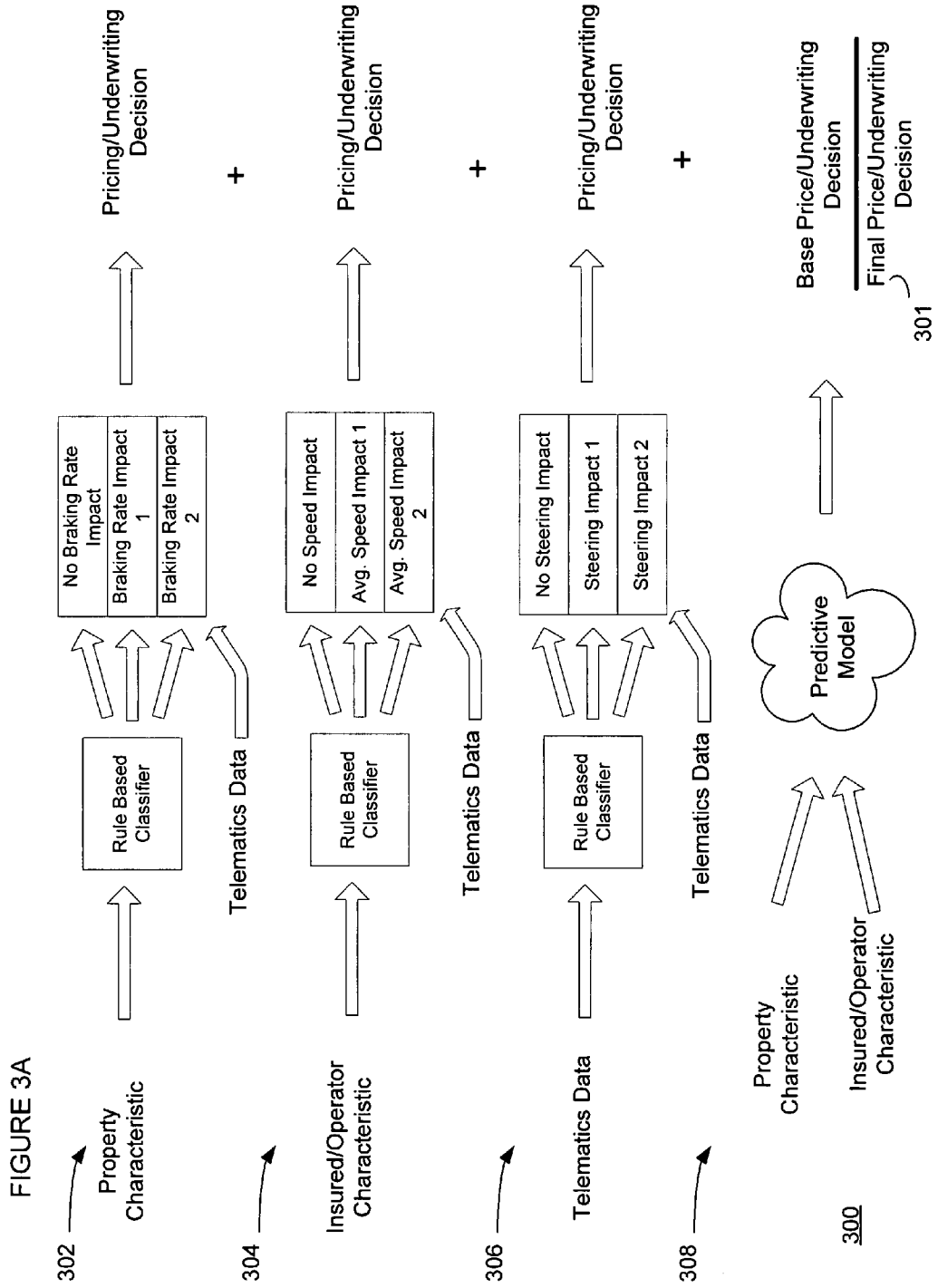

SYSTEMS AND METHODS FOR ANALYZING SENSOR DATA

CROSS-REFERENCE TO RELATED APPLICATIONS

This application is a continuation-in-part of U.S. patent application Ser. No. 10/655,804, entitled, "System for the Acquisition of Technology Risk Mitigation Information Associated with Insurance," and filed on Sep. 4, 2003, the entirety of which is herein incorporated by reference.

FIELD OF THE INVENTION

The invention relates to systems and method for analyzing sensor data collected from property. More particularly it relates to systems and methods for analyzing sensor data collected from property in order to make insurance related decisions.

BACKGROUND OF THE INVENTION

A number of entities have proposed various systems and methods for incorporating information collected from sensors monitoring the operation of insured vehicles into insurance pricing and/or underwriting decisions. Some of the proposals date back as many as twenty years. For example, U.S. Pat. No. 4,843,578, describing a system in which an insurance company adjusts its rates based on logs indicating how often insured vehicles exceed predetermined speeds, was filed in July of 1987. Such prior proposals have promised lower customer premiums and better risk assessment and management capabilities for insurance companies. One shortcoming, however, of prior systems and methods for utilizing collected sensor data (also referred to as "telematics data") is that the systems fail to accurately take into account that such data is not uniformly informative for all customers and properties being insured. This shortcoming may explain why, in twenty years, no insurance company has effectively commercialized an insurance product that takes into account the results of remote property monitoring. The relationships between various characteristics of insured customers, insured properties, and sensor data as they relate to risk are complex and intertwined.

Thus, a need remains in the art for a system and methodology of effectively utilizing data collected from sensor monitoring insured property based on these complex relationships.

SUMMARY OF THE INVENTION

In part to address the shortcoming described above, according to a first aspect, the invention relates to systems for making property insurance underwriting decisions based on collected sensor data using a processor that varies the way in which it manipulates the collected sensor data based on a characteristic of the property being insured, a characteristic of the entity seeking the insurance, and/or on the value of one or more collected data parameters. According to another aspect, the invention relates to a system for making property insurance pricing decisions based on a similarly dynamic process.

In various embodiments of these systems, the processors process the collected sensor data using a statistical model, a neural network, or a decision tree. In addition, in certain embodiments, the processors vary the way in which they process the collected data by selecting different sets of collected data parameters to take into account in making the underwriting and pricing decisions. For example, in one embodiment, if the property to be insured has a first characteristic, the processors take into account a first set of collected data parameters, and if the property has a different characteristic, the processors take into account a set of collected data parameters that is at least partially different.

Similarly, if an entity requesting insurance has a first characteristic the processor takes into account a first set of collected data parameters, and if the entity has a different characteristic, the processor takes into account a set of collected data parameters that is at least partially different. By the same token, in one embodiment, if a predetermined collected data parameter has a first value, for example it exceeds a threshold, the processor takes into account a first set of collected data parameters, and if the collected data parameter has a second value, for example, falling below the threshold, the processor takes into account a set of collected data parameters that is at least partially different.

In certain embodiments, in addition to, or instead of, dynamically selecting a set of collected data parameters to analyze, the processor varies the way in which it manipulates collected sensor data by varying a weight accorded to one or more parameters based on property characteristics, requesting entity characteristics, and/or collected data parameter values.

In additional aspects, the invention relates to methods and computer readable media encoding computer executable instructions for carrying out the methodologies described above.

BRIEF DESCRIPTION OF THE DRAWINGS

The foregoing discussion will be understood more readily from the detailed description of the invention with reference to the following drawings:

FIG. 2 is a flow chart of a process carried out by the system of FIG. 1 for processing requests for insurance.

FIG. 3A is a diagram depicting a first underwriting and pricing process carried out by the business logic computer of FIG. 1, according to an illustrative embodiment of the invention.

DETAILED DESCRIPTION OF CERTAIN ILLUSTRATIVE EMBODIMENTS

To provide an overall understanding of the invention, certain illustrative embodiments will now be described, including various methods and systems for insuring property. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

Figure 1:
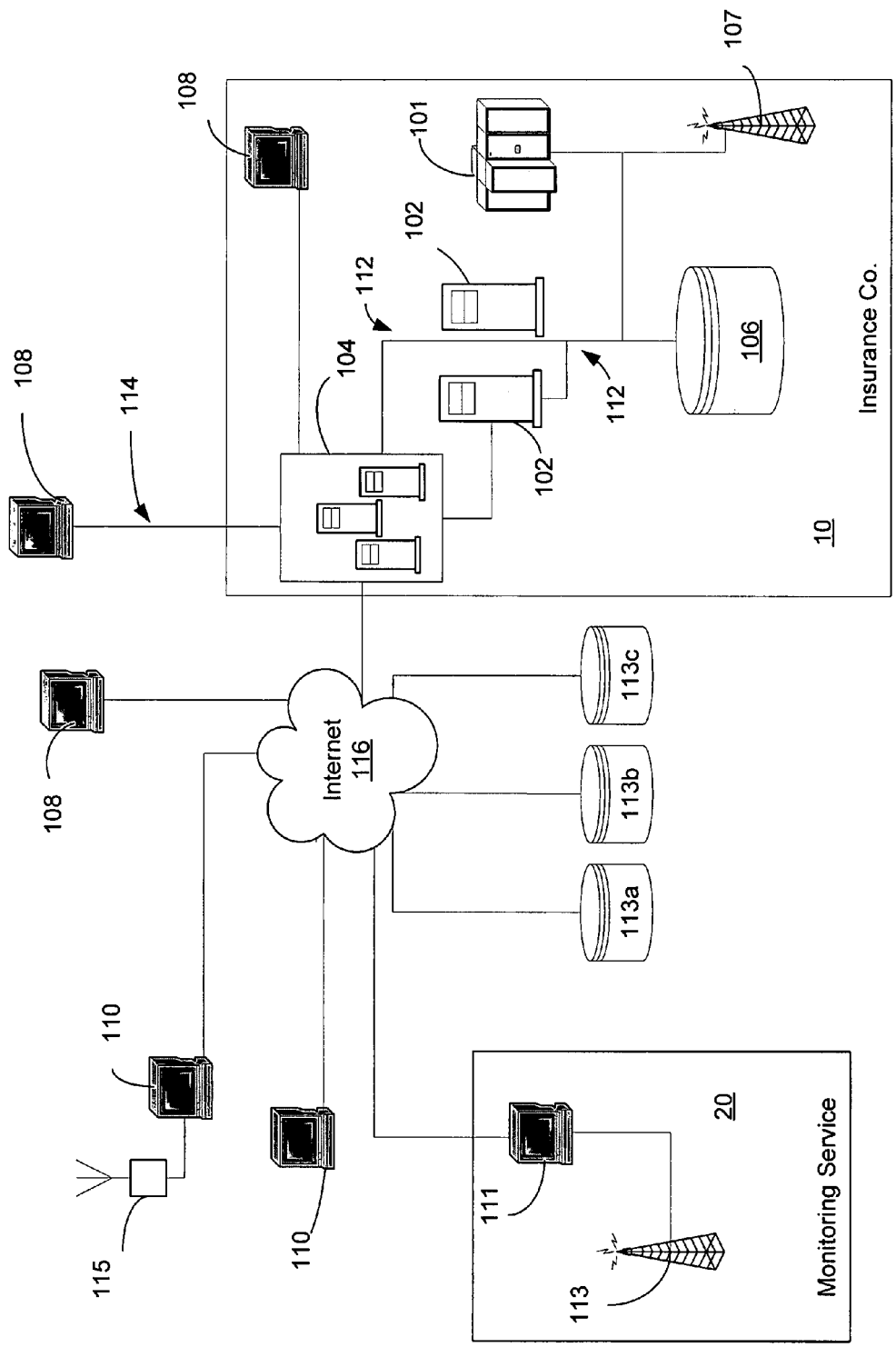
FIG. 1 is a block diagram of a system for insuring property operated by an insurance company, according to an illustrative embodiment of the invention.

FIG. 1 is a block diagram of a system 100 for insuring property operated by an insurance company 10, according to an illustrative embodiment of the invention. The system 100 includes one or more application servers 102, one or more load balancing proxy servers 104, a central database 106, a business logic computer 101, and an optional wireless transceiver 107. Users interact with the system 100 via terminals. Employees of the insurance company 10 and agents utilize agent/employee terminals 108 and customers utilize customer terminals 110. A monitoring service 20 interacts with the system 100 via monitoring computer 111. The system has access to various data sources 113a-113c made available by third parties, as well.

Agent/employee terminals 108 may be connected directly to an application server 102, or they may access an application server 102 via the load balancing proxy servers 104. Agent/employee terminals connect to load balancing proxy servers 104 via a local area network 112, a private data link 114, or via the Internet 116. Customer terminals 110 and the monitoring computer 111 access the application servers 102 via the load balancing proxy servers 104 over the Internet 116. The business logic computer 101 is connected to the database 106 and the application servers 102 over a local area network 112. In addition, other network infrastructure, including, for example a firewall, backup servers, and back up data stores, may also be included in the system 100, without departing from the scope of the invention. Communications over the local area network 112 and/or over the Internet, in one implementation, may be encrypted. In addition, such communications, whether encrypted or not, may also be digitally signed for authenticating the source of the communications. The system 100 may also include a certificate authority to authenticate one or more of the communications using public key infrastructure.

In general, the agent/employee terminals 108 and the customer terminals 110 can be any general purpose computer or other computing device (e.g., a personal digital assistant or cell phone) having suitable software for interacting with software operating on the application servers 102. In one implementation, the terminal software includes a web browser. In such an implementation, upon entering the URL of a corresponding insurance company 10 website, one of the load balancing proxy servers 104 assigns an application server 102 to interact with the terminal 108 or 110. The load balancing proxy server 104 selects an application server 102 based on the current load of the available application servers 102. The assigned application server 102 then generates a series of web pages for presentation via the web browser of the terminal 108 or 110 for review of and interaction with the user of the terminal 108 or 110. The URL for accessing the system, the series of web pages, and the functionality provided by those web pages may vary depending on whether the user is a customer, an agent, or an employee of the insurance company 10. In general, agents and employees have access to more information and functions than customers.

The series of web pages enables the user of the terminal (i.e., a customer, an agent, or employee of the insurance company 10) to request a new insurance policy or to adjust an existing insurance policy. An initial web page requests a user to log into the system by opening an account or by providing identification and authentication information. After logging into the system, a user is provided the opportunity to request a new insurance application or to adjust an existing insurance policy for a customer.

As part of requesting a new insurance policy, the user is asked to provide characteristics of the customer and the property being insured. In general, there are two major classes of insurance that can be requested via the web pages, personal lines and commercial lines insurance. For personal lines insurance policies, a user can request a new auto policy, a new homeowners policy, or a new renters policy. For auto insurance, a web page requests information about the owner of the vehicle to be insured, intended drivers of the vehicle, the vehicle make and model, the intended use of the vehicle (for example, pleasure, commuting, business, etc.) and if available, the vehicle identification number. For homeowners insurance, the web page requests information about the owner of the property and information about the property, itself, including location, size, construction type, and safety features. For renters insurance, additional information is requested about the tenant. In both cases, information is also requested about the value of property located within the building for which insurance is requested. Similar information is collected for commercial lines policies. In addition, for commercial lines policies, among other items, the web pages request a description of the intended use of each automobile or building being insured. For both personal and commercial policies, information collected from the user may be augmented by data collected from third-party data sources.

If the user accesses the system 100 to alter a policy, the application server 102 presents a web page requesting information about the desired policy change. For example, a user can enter information about the purchase of new property to be covered by the policy, the removal of a property to be covered by the policy, or a request to alter the policy limits and/or deductibles.

Customer terminals 110, in one implementation, include a communication device 115 and related software for obtaining, recording, and forwarding data collected by sensors monitoring the customers' buildings (e.g., smoke detectors, temperature sensor, intrusion detection systems, humidity sensors, particulate sensors, and meteorological sensors), vehicles (e.g., speedometers, odometers, braking sensors, air bag deployment sensors, GPS or other location detectors, accelerometers, and steering monitors), or other property (e.g., accelerometers, GPS or other location detectors, humidity detectors, and temperature sensors). For example, the communication device 115 may include a wireless transceiver configured for 802.11, 802.16, BLUETOOTH™, CDMA, GSM, EVDO or other wireless communication protocol. The communication device 115 communicates directly with the sensors or with a computing device aggregating data output by the sensors (referred to as a "data aggregating device"), for example, an automobile's onboard diagnostic computer. Alternatively, the customer terminal 110 may include a memory card reader or other device for accepting removable digital storage media removed from the sensors or a data aggregating device to collect the monitoring data.

In one implementation, the related software, stored, for example, on a computer readable medium, includes an automated webservice application, using for example, XML, SOAP, or HTTPs, for uploading sensor data to the monitoring service 20 or to the insurance company 10. The webservice may be configured to upload collected sensor data in real time, on a daily, weekly, or monthly basis, as new information becomes available, or according to any other regular, semi-regular, or random schedule. In alternative implementations, the related software, when executed on the user terminal 110 presents a user interface to the customer via which the customer can elect to send the collected data to the insurance company 10 or monitoring service 20, or to refrain from doing so. In still another alternative implementation, the web pages provided by the application servers 102 may include a feature enabling the upload of collected sensor data to the application servers 102. Alternatively, the sensors monitoring the property or a data aggregating device aggregating data from such sensors may communicate directly with the monitoring service 20 or insurance company 10 using wireless communications or via the Internet 116. Uploaded data may include raw sensor information collected since the previous data upload and/or summary data indicative of the such raw sensor data. Real time sensing provides the advantage of reducing the risk of data tampering by an unscrupulous customer or a malicious third party.

The insurance company 10 may elect to receive sensor data from monitored property directly, or it may opt to utilize a monitoring service 20 to do so on its behalf. If the insurance company 10 elects to directly monitor data collected by sensors monitoring insured property, it does so through a communication device. The communication device may be the optional wireless transceiver 107, configured for receiving wireless transmissions according to a CDMA, GSM, or EVDO protocol. In alternative implementations, the communication device may be a network interface for accepting data over the Internet 116, for example via the proxy server 104.

Using a monitoring service 20 decreases the capital expenditures required of a insurer to implement an insurance product that takes property monitoring into account. The monitoring service 20 may also serve as a verified data repository, such that if the customer decides to switch insurance carriers, the customer can provide historic sensor data to the new insurer.

The monitoring service 20 includes the monitoring computer 111 referred to above. The monitoring computer 111 may be a single computer or a system of computers connected to a communication device configured for receiving the output of sensors used to monitor insured buildings, vehicles, and other property. The communication device may be a wireless transceiver 113, such as a CDMA, GSM, or EVDO transceiver for receiving digital wireless communications. In alternative implementations, the communication device may be a network interface for accepting data over the Internet 116. The monitoring service 20 may act merely as a conduit, passing received sensor data along to the insurance company 10 directly, or it may carry out preprocessing of the data before forwarding. In one implementation, for the monitoring of insured vehicles, the monitoring service 20 calculates a driving score based on the collected sensor data and forwards the driving score to insurance company 10 instead of forwarding the underlying data.

The system 100 obtains access to additional data on which to base its decisions from third party data vendors 113a-113c. These vendors may include governmental entities, such as departments of motor vehicles, registrees of deeds, zoning commissions, fire departments, police departments, and census bureaus. The vendors may also include private data providers, including companies that provide financial information about individuals and business entities, historical weather information, analysis of driving records, histories of insurance claims, and other information deemed useful by the insurance company 10 in making insurance decisions.

Referring back to FIG. 1, based on the information provided via the web page, the business logic computer 101 carries out an underwriting and pricing process through which the system 100 determines whether to offer new coverage to a customer, and if so at what price. For existing policies adjusted by a user via the system 100, the business logic computer 101 determines whether the adjustment merits a change in insurance premium. For new customers, the underwriting and pricing processes may occur in stages. For example, if a new customer cannot provide prior verified sensor data, for example, from a prior insurer or from a monitoring service 20 archiving such data for the customer, the customer, depending on the other information provided, may be provided provisional insurance coverage during which the insurance company 10 collects data from sensors monitoring the insured property to make a final underwriting and initial premium decision. The actual premium the customer pays may vary based on data collected from the sensors at a later date. FIG. 2 depicts a high level flow chart of the process carried out by the system 100 in processing requests for insurance. More detailed examples are described further below in relation to FIGS. 3-5.

The output of the underwriting and pricing processes are output to the user of the terminal 108 or 110. In one implementation, for requests for new policies, the output takes the form of a web page, including an offer for insurance. The web page includes a corresponding premium amount, an option to bind the policy, and functionality to accept payment from the customer for the new policy. For policy adjustments, the output takes the form of one or more web pages, which include the updated premium and/or an updated version of the policy or portions thereof. In alternative implementations, the output is printed out and mailed, faxed, or otherwise communicated to a customer.

In one implementation, software operating on the application servers 102 merely provide presentation and data extraction functions. All substantive business logic, including underwriting and pricing determinations, is carried out on the business logic computer 101. In this implementation, the application servers 102 obtain data from the database 106 and the business logic computer 101 and incorporate that data into web pages (or other graphical user interface formats). These web pages are then communicated by the application servers 102 through the load balancing proxy servers 104 to terminals 108 and 110 for presentation. Upon receiving input from the terminals 108 or 110, the application server 102 translates the input into a form suitable for processing by the business logic computer 101 and for storage by the database 109. In this implementation, the application servers can be operated by third parties, for example, independent agents, who can add their own branding to the web pages or add other customized presentation data. In alternative implementation, at least some of the business logic is also carried out by the application servers 102.

In another implementation, the application servers 102 are software modules operating on one or more computers. One of the computers on which the application servers 102 are operating may also serve as the business logic computer 101 and/or as a load balancing proxy server 104.

In other implementations, the software operating on the terminals 108 and 110, includes a thin or thick client application in addition to, or instead of web browser. The thin or thick client application interfaces with a corresponding server application operating on the application server 102.

As used herein, the term software refers to any computer executable instructions stored on a computer readable medium, including without limitation, a magnetic, optical, magneto-optical, or integrated circuit for storing digital information, which if executed by a computer causes the computer to carry out a process defined by the instructions.

FIG. 2 is a high level flow chart of a method carried out by the system 100 of FIG. 1 in processing requests for insurance. Referring to FIGS. 1 and 2, the method begins with the receipt of a request to insure property (step 202). As described above, the request may be received at an application server 102 from a customer terminal 110 or an agent/employee terminal 108 via a proxy server 104. The system then requests and obtains information about the customer and the property to be insured (step 204). The information is obtained in part through requests posed to the customer or insurance agent or employee assisting the customer. Additional information is obtained through the third party data vendors 113a-113c and from the central database 106.

Insurance products that incorporate the use of collected sensor data in pricing and underwriting enable insurance companies to insure customers that might otherwise be outside of their appetite. That is, the risks presented by insuring a particular property owned or operated by a particular entity may be too large for an insurance company to accept unless it is actively able to monitor the use of the property. Thus, in one embodiment, after obtaining basic information about the property and customer at step 204, the system 100 determines whether sensor data is needed for making a final insurability decision at decision block 206. The system may determine that sensor data is unnecessary, for example, if the system 100 determines that no amount of sensor data will bring the requested policy within the appetite of the insurance company, resulting in the request for being denied at decision block 216.

Insurance products using collected sensor data for adjusting premiums may also be used to reward customers that use and maintain insured property safely. Thus, in some circumstances, collection of sensor data is not necessary, but instead is merely an option provided to customers that may lead to lower premiums. In such situations, decision block 206 may be skipped, and the method proceeds directly from the receipt of basic customer and property information (step 204) to determining whether sensor data is available (decision block 208). Sensor data is likely to be available in three circumstances. In the first circumstance, the request for insurance is actually a request to renew an insurance policy nearing the end of its term. In such situations, sensor data from the prior term may be available. In a second situation, the customer may be switching insurers and sensor data provided to the prior insurer may be made available from the prior insurer or from a monitoring service utilized by the prior insurer to collect data. Finally, the customer may have been collecting sensor data generated from sensors monitoring the customer's property for other purposes than insurance, for example, employee monitoring, maintaining environmental conditions within an insured building, or providing data to an alarm or maintenance company. Any or all of this data, depending on the systems and policies of the customer and the various monitoring entities may be made available to the insurance company.

If sensor data is not available (at decision block 208), the insurance company 10, in one embodiment offers the customer insurance during a probationary period (step 210) during which the insurance company 10 can obtain baseline sensor data (step 212) on which it can base its underwriting and pricing decision. Depending on the characteristics of the insured property, the customer, and/or the data collected during the probationary period, the probationary period may vary in length, for example, from about one to about three months. For example, if the sensor data in a first month exhibits a great deal of variability, the period may be extended. The sensor data can include a number of parameters depending on the type of property to be insured. For example, for vehicles, the monitored parameters can include speed, acceleration, braking, turning speed, blinker usage, driving time of day, mileage, driving location, seat belt usage, and number of passengers. Raw vehicle operation data can be combined with location data to determine relevant speed limits, presence of stop signs, and other relevant location-based traffic laws, and a driver's adherence thereto. Other useful specific information may be derived from collected location data, including, for example, traffic patterns, road quality, incline and decline grades, crime rates, weather conditions and patterns, and accident rates. The parameters can also include data indicating the condition of the vehicle, including, without limitation, oil level, tire pressure, engine temperature, brake condition, fuel level, and the status of warning light indicators. For buildings, the monitored parameters can include temperature, humidity, exterior wind speeds, times and durations of open doors and windows, air quality, occupancy, operational hours, and safety equipment condition. For both vehicles and buildings, the monitored parameters may also include activity levels associated with the vehicles, including, for example, how often the property or items (e.g., hazardous equipment, tools, radio, speed control, headlights, or alarm systems) within the property are used as well occupancy rates for the property. For goods, the monitored parameters may include temperature, humidity, air quality, location, acceleration, and shock. The premium offered by the insurance company 10 during the probationary period is likely higher than the premium that would be paid during a non-probationary coverage period, unless the data collected during the probationary period suggests the risks of issuing a non-provisional policy are substantially higher than expected based on the non-sensor related information collected prior to the probationary policy.

The system 100 then analyzes the sensor data made available at decision block 208 or collected at step 212 (step 214). The exact analysis process, as described further below, is determined dynamically based on the sensor data collected, information about the customer, and/or information about the property being insured. For example, the analysis may take into account different monitored parameters or take into account the same parameters to different extents. Preferably, the analysis is carried out using one or more predictive models, such as statistical models, neural networks, expert systems, or other forms of artificial intelligence.

Based on the analysis carried out at step 214, the system 100 decides whether to offer insurance to the customer under the terms requested by the customer (decision block 216), and if so, calculates a premium for such a policy (step 218). The premium may be calculated holistically for an entire policy, or separately for each coverage (e.g., collision, comprehensive, medical, uninsured motorist, physical damage, bodily injury, rental, and/or towing) requested in the policy. In one embodiment, the analysis of collected data (step 214), the decision to offer or deny insurance (decision block 216), and the determination of a premium (step 218) constitute a single process carried out by the business logic computer 101 of the system 100. In alternative implementations, the underwriting decision (decision block 216) and the pricing calculation (step 218) are carried out separately in series.

After determining a premium for the policy (step 218), the system forwards an offer for insurance to the customer terminal 110 or employee/agent terminal 108 (step 220). If the customer rejects the offer (decision block 222), for example, due to the premium being higher than desired, or if the system 100 declines to offer insurance (at decision block 216), the process ends. If the offer is accepted (decision block 222), the insurance system 100 issues an insurance policy covering the property (step 224). After the policy is issued (step 224), the insurance company 10, either directly or through a monitoring service 20 continues to monitor the output of the sensors monitoring the insured property (step 226). Based on the results of the monitoring, the system 100 occasionally or periodically adjusts the premium charged to the customer (step 228). The premium change, if any, preferably uses the same artificial intelligence used to set the initial premium (step 218). The premium change may affect the premium charged in future periods, in prior periods, e.g., through issuance of a refund or surcharge, or in a current period, depending on the specific implementation of the method. Alternatively, the premium change may only affect the premium charged for a renewal policy after the expiration of the current policy term.

While others have suggested utilizing data collected from sensors monitoring vehicles for insurance underwriting and pricing, the prior methods have failed to adequately take into account the fact that sensor data is not equally relevant to all insurance customers and all property requested to be insured. The following illustrative underwriting and premium pricing processes demonstrate that such distinctions can be made to achieve a more accurate insurance determination.

FIG. 3A is a diagram depicting a first underwriting and pricing process 300 carried out by the business logic computer 101 of FIG. 1, according to an illustrative embodiment of the invention. The process 300 generates an underwriting and a pricing decision 301 for a request for personal lines auto insurance. The process 300 is showed in simplified form for illustrative purposes. The process 300 could also be adapted for use in commercial lines automobile or property insurance requests as well as for personal lines property insurance requests without departing from the scope of the invention.

According to the process 300, four separate underwriting and pricing determinations are made in independent process 302, 304, 306, and 308. The results of the four are combined to yield both a final underwriting decision and a final pricing decision 301. Negative underwriting results from one process may be compensated for by positive underwriting results from other processes. Together, the processes determine which data parameters collected by sensors monitoring the vehicle are used in making the underwriting and pricing decisions and the weight each parameters plays in the decision making process.

The first process 302 determines whether and to what extent a driver's braking behavior effects whether the vehicle should be insured, and at what cost. According to the process 302, this determination is based on characteristics of the vehicle, for example, its size and its breaking system. Drivers with a habit of abrupt braking are at a greater risk of collisions resulting from a failure to stop. Larger vehicles require greater distances to stop and cause more damage upon impact. These factors, combined, make the risk associated with insuring larger vehicles with less efficient brakes greater than the risk associated with insuring smaller vehicles with better brakes. The risk posed by large vehicles can be mitigated, however, if the vehicle is driven with safer braking habits.

To translate these general principles into practical insurance decisions, a rule based classifier in the business logic computer 101 can be programmed with a set of rules that place a request to insure a vehicle into one of three categories: braking behavior is irrelevant, braking behavior is relevant, and braking behavior is important. For example compact cars with anti-lock brakes are assigned by the rule based classifier into the first category. Trucks with anti-lock brakes and mid-sized sedans with ordinary disk brakes fall into the second category. Trucks with standard disk brakes fall into the third category.

Based on the category into which the vehicle is categorized and actual data collected about the braking behavior of drivers of the vehicle, an underwriting and pricing impact is calculated. In one embodiment, the underwriting portion of the process 302 includes a kill question. That is, there is a threshold, which, if met, would demand denial of the request for insurance coverage, regardless of what other parameters may be. For example, for vehicles in the third category, i.e., those with the greatest risk of collisions resulting from a failure to stop, an insurance request is "killed" if sensor data indicates that the vehicle stops abruptly, on average, more than once per day. If a request is killed, the customer is notified and further processing of the request is cancelled, avoiding unnecessary processing.

If the request for insurance survives the "kill question" of process 302, a pricing result and an underwriting result are generated based on the category and observed braking behavior. For vehicles falling into the first category, braking behavior is ignored in making the pricing and underwriting decision, as braking behavior will have little impact on the risk posed by the vehicle. For vehicles that fall into the second category, safe braking habits may yield a small credit and a positive underwriting result. Poor braking habits may yield a small premium surcharge and a somewhat negative underwriting result. For vehicles in the third category, safe braking habits may yield a more significant premium credit, as a greater portion of the risk associated with insuring such a vehicle is managed well by the driver. Poor braking habits, if not sufficiently poor to surpass the "kill threshold" may result in a substantial premium surcharge and negative underwriting result.

While in the illustrative process 302, a vehicle's size and braking system impact only the way in which the business logic computer 101 manipulates a single collected data parameter, i.e., braking behavior. The same factors may be used to dictate the way in which the business logic computer 101 manipulates other collected data parameters, including, for example, speed or acceleration. The rules used to assign a vehicle to a braking behavior category may be identical to those used to assign the vehicle to speed or acceleration categories. Alternatively, the business logic computer may implement separate classification rules for each collected data parameter. Particularly in this second case, the business logic computer may take one set of collected data parameters into account if the vehicle has a first characteristic (e.g., it has anti-lock brakes) and a second set of collected data parameters into account if the vehicle has a second characteristic (e.g., it has disc or drum brakes). Other vehicle characteristics that may be employed as determinants of the impact of various collected data parameters include, without limitation, vehicle safety ratings, engine size, color, cargo capacity, and age. In insuring buildings, characteristics of the buildings that may be used as determinants of the impact of collected data parameters include building age, construction, location, and use.

The second process 304 determines if, and to what extent, the average speed at which a vehicle is driven impacts the insurance pricing and underwriting decision. In the illustrative process 304, the determination is based on a characteristic of an owner seeking to insure the vehicle. Such characteristic might be, for example, the driver's age and/or driving record. These characteristics are analyzed by another rule-based classifier to assign insurance requests into three categories. In the first category, speed is considered irrelevant, in the second category, speed is relevant, and in the third category, speed is considered important. As in the first process 302, the request for insurance is considered in light of the category and the actual data observed by the sensors monitoring the vehicle. Analysis of the actual vehicle speed may result in "killing" the request, or it may result in a range of pricing and underwriting results, as described above.

As with the first process 302, the characteristic of the entity seeking to insure the vehicle, i.e., its owner and driver, may impact the way the business logic computer 101 manipulates multiple collected data parameters. For example, the age of the owner may also dictate the way the business logic computer takes into account the time of day during which the vehicle is driven and/or the acceleration behavior detected by sensors monitoring the vehicle. For example, for a vehicle owned by a minor, the business logic computer may ignore the time of day during which the vehicle is driven, consider the vehicle's speed (for example, the average speed, maximum speed, and/or a actual speed/posted speed limit differential) important, and the vehicle's acceleration only relevant. Alternatively, for a teen driver, number of passengers and the day of week and time of day of driving may be important. In contrast, for an elderly vehicle owner/operator, the business logic computer may ignore acceleration behavior, consider speed relevant, and time of day important. Thus, based on the value of this one characteristic of the entity seeking insurance, different sets of collected data parameters may be taken into account in making underwriting and pricing determinations. Additional characteristics of an entity that may be employed as determinants of the way in which the business logic computer 101 manipulates collected data parameters in making underwriting and pricing decisions include, without limitation, driving history, gender, and for commercial vehicles, the line of business in which the entity is involved.

The third process 306 determines if, and to what extent, the steering behavior with which a vehicle is driven impacts the insurance pricing and underwriting decision. In the illustrative process 306, the determination is based on sensor data collected from monitoring the vehicle. Relevant data parameters might include, for example, the speed at which the vehicle is driven. For example, erratic or frequent steering at high speeds may be indicative of aggressive highway lane changing or reckless turning.

Speed is analyzed by a third rule-based classifier to assign insurance requests into three steering behavior categories. For example, in one implementation, the third rule-based classifier assigns requests based on average speed. If average speed falls below 45 miles per hour, a vehicle is assigned to a first category. If average speed falls between 46 miles per hour and 60 miles per hour, the vehicle is assigned to a second category, and if the average speed exceeds 60 miles per hour, the vehicle is assigned to the third category. In an alternative implementation, the third rule-based classifier assigns requests based on the frequency of the vehicle speeding (i.e., driving above a posted speed limit). In another alternative implementation, the third rule-based classifier assigns requests based on the average speed of the vehicle in relation to the speed of nearby vehicles, determined, for example, by sonar, laser, radar, or other ranging technology incorporated in the vehicle.

In the first category, steering behavior is considered irrelevant, in the second category, steering behavior is relevant, and in the third category, steering behavior is considered important. Subsequently, the request for insurance is considered in light of the category and the actual vehicle steering behavior observed by the sensors monitoring the vehicle. Analysis of the actual steering behavior may result in "killing" the request, or it may result in a range of pricing and underwriting results, as described above. As with the other processes 302 and 304, the value of a collected data parameter may govern the application of, and weight assigned to more than one other collected data parameter. Additional data parameters that may be employed as determinants of the way in which the business logic computer 101 manipulates those data parameters or others in making underwriting and pricing decisions include, without limitation, driving location, how often the vehicle is used, and the environment, e.g., weather conditions, in which the vehicle is driven.

Finally, according to a fourth process 308, a base price and underwriting determination are made based purely on information related to the customer and intended drivers of the vehicle and information about the vehicle itself. The information utilized for this process is obtained from the web pages presented by the system 100 along with information garnered from the third party data sources 113a-113c based on the information submitted through the web pages.

In a particular implementation, each process results in an absolute price determination and an underwriting score. So long as the sum of the underwriting scores stays within a specified range, the system 100 offers insurance coverage to the customer. If the number falls outside of the specified range, insurance coverage is denied. In determining the absolute costs for the first three processes 302, 304, and 306, each category is associated with a multiplier. For example, the process 302 may add a surcharge determined by the following equation:

$$\text{Surcharge} = \text{multiplier} \times \$100 * \text{average number of abrupt braking incidents per day}.$$

As indicated above, in the first category, braking is deemed irrelevant, and therefore the multiplier associated with the first category is zero. The multiplier associated with the second category is 1.0 and the multiplier associated with the third category is equal to 2.0. The speed related surcharge is determined as follows:

$$\text{Surcharge} = \text{multiplier} * \$10.00 * (\text{average speed} - 55 \text{ mph}).$$

In this case, the multiplier associated with the first category is zero. The multiplier associated with the second category is 1.0, and the multiplier associated with the third category is 3.5. In alternative implementations, the categories may be associated with exponent values, log values, or other modifiers or functions to apply to the value of the data parameter in question instead of a simple multiplier.

In practice, an actual pricing and underwriting process may have fewer than four or more than four underwriting and pricing processes. In addition, while the processes 302, 304, 306, 308 describe assigning insurance requests to one of three categories, in practice, the processes may assign requests to one of four, five, ten, twenty or more categories. In addition, the equations for determining premium modifications may be substantially more complicated.

Figure 3B:
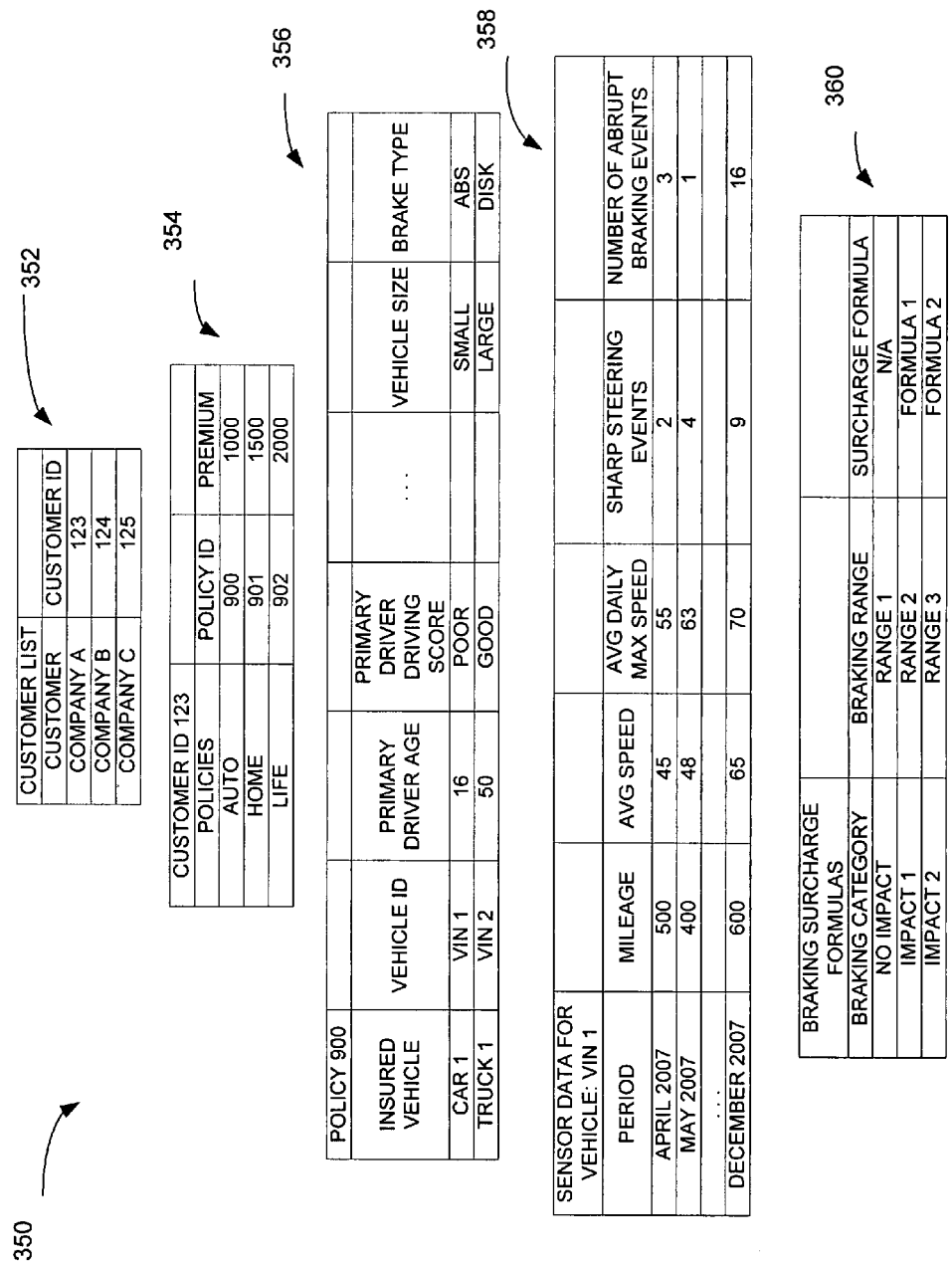
FIG. 3B is diagram of illustrative data tables maintained by the database of FIG. 1 for implementing the process of FIG. 3A.

FIG. 3B depicts data tables 350 maintained by the database 106 of FIG. 1, for implementing the underwriting and pricing process 300, according to an illustrative embodiment of the invention. The data tables 350 include a customer list data table 352, a customer policy data table 354 for each customer, a policy data table 356 for each issued policy, a sensor data table 358 for each piece of insured property for which sensor data is collected, and formula tables 360 for determining premiums based on the data stored in the remaining tables. The set of tables 350 and data parameters within the data tables 350 selected for depiction in FIG. 3B highlights the types of data and that may be stored within the database 106 for use in the process 300, and is in now way intended to be limiting of the types of data that may be stored, or the format in which is may be stored, in any given implementation of the system 100. Similar data tables may be employed to implement the processes described below with respect to FIGS. 4 and 5.

The customer list data table 352 includes a list of the customers served by the insurance company with an associated customer ID used for identification purposes in the database. For each customer listed in the customer list data table 352, the database 106 includes a customer policy data table 354. The customer policy data table 354 lists the various policies issued to the customer along with a corresponding ID and premium value. In the illustrative customer policy data table 354, the premium value is an annual premium value. Alternatively, the premium value may be stored for any desired period, including premium per day, per week, per month, or per quarter. In one implementation, the premium period is selected to correspond to the frequency with which the premium may be adjusted based on the collected sensor data. The premium is determined by the business logic computer 101 and forwarded to the database 106 for storage.

For each policy, the database 106 includes a policy data table 356. The policy data table 356 includes data describing the property covered by the policy, and if relevant, information about users of the property. Such data may include identifying information relevant to premium pricing. For example, for a vehicle, the policy data table 356 identifies the make, model, value, prior damage, vehicle size, and braking technology employed by the vehicle. It also includes data about the primary driver of the vehicle, including his or her age and a characterization of their driving history.

The set of data tables 350 stored in the database 106 also includes sensor data tables 358 for insured pieces of property. For vehicles, the sensor data table 358 may be indexed by vehicle identification number. In the illustrative sensor data table 358, data is stored on a period basis, for example, as aggregate information for each month of coverage. The sensor data table 358 includes mileage data, average speed data, average daily maximum speed, a number of high acceleration events, and a number of abrupt braking events. This data may be fed directly from data uploaded from the sensors, or it may first be processed by the business logic computer 101 or an application server 102 to generate the aggregate information.

The illustrative data tables 350 also include formula data tables 360 used to calculate premiums based on the data stored elsewhere in the database 106. For example, to calculate the a surcharge resulting from braking behavior, a braking formula table 360 includes a list of braking categories, with corresponding ranges that define membership in the category, as well as corresponding formulas for calculating surcharges based on membership in each respective category. During a pricing or underwriting decision, the business logic computer 101 retrieves the appropriate formulas from the formula tables 360 to make its determination. In addition, as additional data is collected, the system can be retrained based on the new data, and new formulas can be stored in the formula data tables 360. In alternative implementations, formulas are encoded directly in the software executed by the business logic computer 101.

As indicated above, the data tables 350 described above are merely illustrative in nature. Various implementations may have fewer or more data tables storing fewer or more parameters without departing from the scope of the invention.

Figure 4:
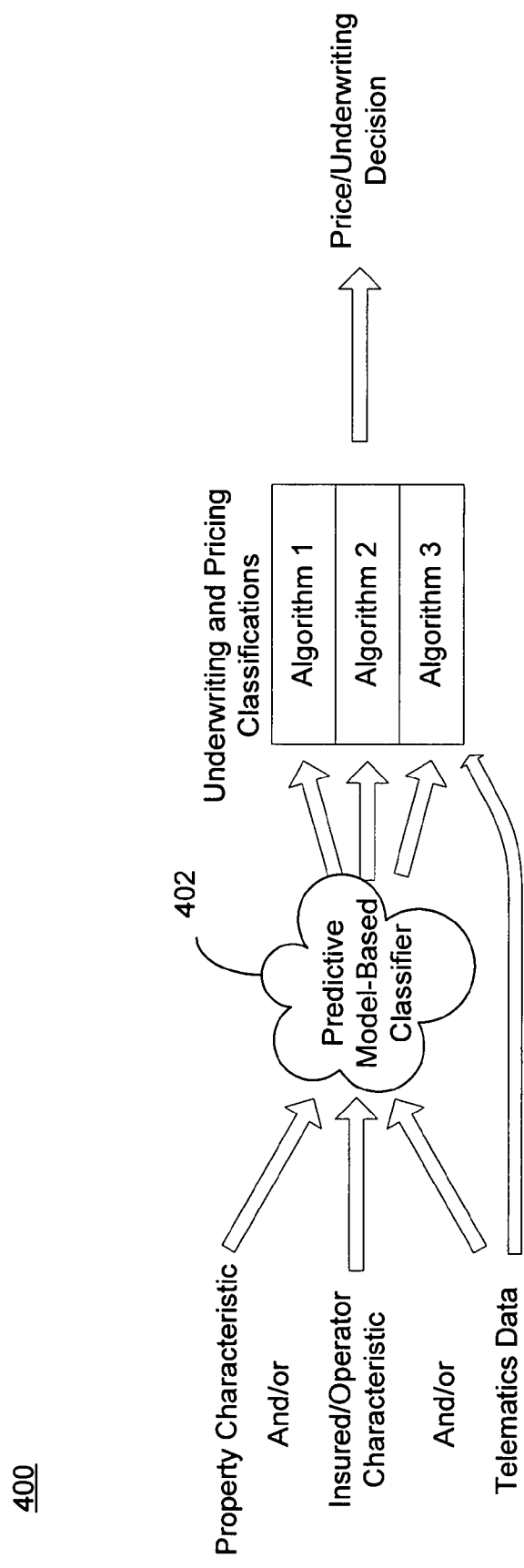
FIG. 4 depicts a second insurance underwriting and pricing process, according to an illustrative embodiment of the invention.

FIG. 4 depicts another insurance underwriting and pricing process 400, according to an illustrative embodiment of the invention. While the process 400 could be used for making decisions for personal lines insurance customers seeking automobile or other property insurance or for commercial lines customers seeking property insurance, the process 400 will be described in relation to a request to obtain a commercial lines insurance policy including automobile coverage.

The core of the process 400 is the use of a predictive model 402 stored in memory by the business logic computer 101 of the system 100. The predictive model 402 assigns each insurance request to a category or classification based on characteristics of the customer and the intended drivers of the vehicle, characteristics of the vehicle, and data parameters collected from monitoring use of the vehicle to be insured. Each category includes its own underwriting and pricing algorithm for determining an underwriting result and an insurance premium based on the collected sensor data parameters in conjunction with other variables available to the system 100. In some embodiments, the variables input into the predictive model 402 for classification may be the same as or different than the variables taken into account by the underwriting and pricing algorithms associated with any given classification. For example, the underwriting and pricing algorithms take into account coverage limits and deductibles requested by the customer, whereas such variables are, in many implementations, left out of the classification analysis. In addition, some categories take into account different sensor data parameters than other categories. Other categories take the same sensor data parameters into account, but to different extents. While the process 400 depicts only three categories, in practice, the predictive model may assign an insurance request among three, four, five, ten, twenty, or other number of categories without departing from the scope of the invention, depending on the granularity they wish to achieve in their underwriting and pricing process.

The underwriting and pricing algorithms associated with each classification correspond to a determination of what parameters are most likely to affect the risk the insurance company would assume in providing the requested insurance. For example, to insure a gasoline tanker truck, the insurance company may be most concerned with the quality of the tanker truck's brakes, the speed at which the truck is driven, the locations through which the tanker truck is driven, and the driving scores of the intended drivers. In contrast, to insure a car used for pizza delivery, the insurance company is likely less concerned about brake quality and driving location, and, depending on the age of the intended driver, the insurance company may be more concerned with average driving speed (for younger drivers) or driving time of day (for older drivers).

The predictive model includes computer-executable instructions and an associated data set. When the computer executable instructions are executed on the business logic computer 101 with a set of input variables, the predictive model outputs a classification. The business logic computer can then apply the rating and pricing algorithms associated with the classification. Several techniques are known in the art for building various types of predictive models. Predictive models suitable for use in the process 400 include Support Vector Machines (SVM), Maximum Entropy Algorithms, Naïve Bayes Algorithms, Genetic Algorithms, Hidden Markov Models, and neural networks trained on prior customer information. The models may be statistical in nature and/or may be based on rules derived by subject matter experts, for example, in the form of decision trees.

Figure 5:
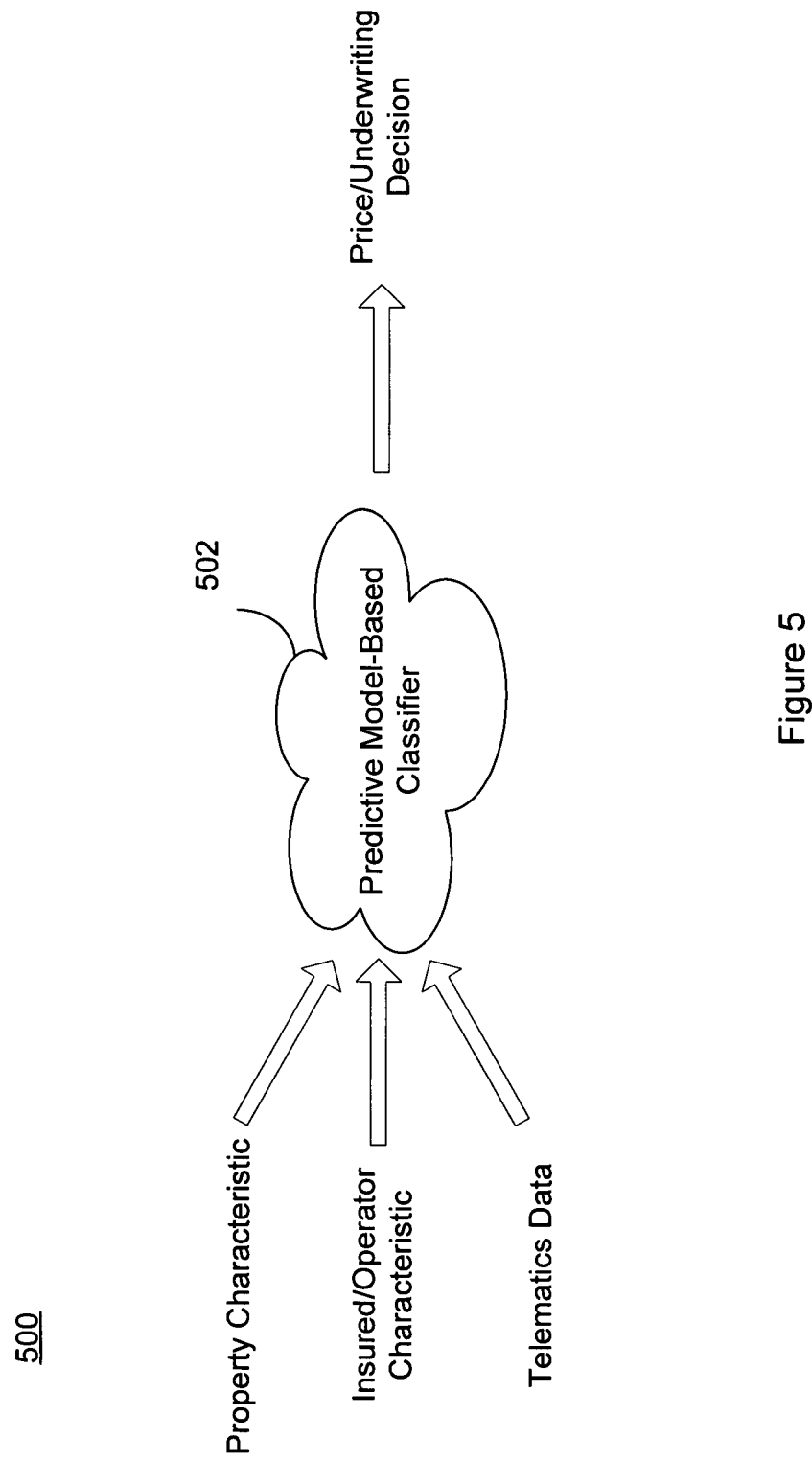
FIG. 5 depicts a third illustrative underwriting and pricing process 500, according to an illustrative embodiment of the invention.

FIG. 5 depicts a third illustrative underwriting and pricing process 500, according to an illustrative embodiment of the invention. As with the first two processes 300 and 400, the process 500 alters the way in which collected sensor data impacts an underwriting and pricing outcome based on one or more characteristics of a customer or operator of a property, characteristics of the property itself, and/or on one or more collected sensor data parameters. The process 500, for illustrative purposes, relates to a process for addressing requests to insure a piece of commercial real estate. The process 500 could be adapted for use in commercial lines automobile insurance requests as well as for personal lines automobile or property insurance requests without departing from the scope of the invention.

In the process 500, a single predictive model 502 directly outputs an underwriting and pricing result, without first outputting a classification. For example, the predictive model 502 is programmed with a base premium price for each set of policy limit/deductible pairs made available to customers. Then, the predictive model 502, using a clustering process, for example, an SVM, determines a set of previously issued coverages having risk profiles to which the requested policy is most similar. An SVM process iteratively separates elements of application in multidimensional space by identifying hyperplanes that maximizes distance between elements on either side of the hyperplanes. The process iterates to divide the elements into smaller and smaller groups. During this iterative clustering process, depending on which cluster an insurance request falls into at an early stage in the clustering process, different dimensions may be relevant in assigning the insurance request to a smaller cluster within that cluster.

After being assigned to a cluster, the loss history of the existing coverages in the cluster are compared to a loss history distribution of the entire universe of coverages. A premium for the new policy is set based on the base premium and where on the distribution of loss histories the assigned cluster falls.

The invention may be embodied in other specific forms without departing form the spirit or essential characteristics thereof. The forgoing embodiments are therefore to be considered in all respects illustrative, rather than limiting of the invention.

What is claimed is:

1. A sensor based analysis system, comprising:
a first communication device for receiving a request to insure a vehicle of an entity;
one or more vehicle telematics sensors, comprising one or more of speedometers, odometers, braking sensors, air bag deployment sensors, location detectors, accelerometers, and steering monitors, collecting data while the vehicle is in operation;
a terminal comprising a remote communication device in communication with the one or more vehicle telematics sensors and storing computer-readable instructions defining an automated webservice application configured to dynamically upload vehicle telematics sensor data;
a second communication device for receiving vehicle telematics sensor data from the remote communication device, wherein the sensor data includes at least one data parameter;
a memory storing a plurality of rating categories, wherein each of the plurality of rating categories is associated with a classification rule and at least one of a plurality of underwriting and pricing algorithms, wherein the at least one of the plurality of underwriting and pricing algorithms associated with one of the plurality of rating categories and the at least one of the plurality of underwriting and pricing algorithms associated with another one of the plurality of rating categories apply different sets of data parameters or sensor data parameter weights;
a computer processor configured to:
obtain a value for the characteristic of the vehicle based on information received via the first communication device, wherein the characteristic of the vehicle comprises one of vehicle size, vehicle safety rating, vehicle engine size, vehicle color, vehicle cargo capacity, and vehicle age;
determine a rating category from the stored plurality of rating categories for the coverage by applying, to the received vehicle characteristic value, the classification rule for each of the plurality of respective rating categories;
obtain an underwriting and pricing algorithm, of the plurality of underwriting and pricing algorithms, corresponding to the identified rating category for use in determining the price;
determine the price based at least in part by applying a set of sensor data parameter weights to the received vehicle telematics sensor data according to the obtained underwriting and pricing algorithm;
an output device for outputting the determined price.

2. The system of claim 1, wherein:
the underwriting and pricing algorithm associated with a first of the rating categories applies a first set of data parameters from the received sensor data for use in generating the price; and
the underwriting and pricing algorithm associated with a second of the rating categories applies a second set of data parameters from the received sensor data for use in generating the price, wherein the second set of data parameters is at least partially different than the first set of data parameters.

3. The system of claim 1, wherein:
the underwriting and pricing algorithm associated with a first of the rating categories applies a first set of sensor data parameter weights; and
the underwriting and pricing algorithm associated with a second of the rating categories applies a second set of sensor data parameter weights, wherein the second set of sensor data parameter weights is at least partially different than the first set of sensor data parameter weights.

4. The system of claim 1, wherein determining the price comprises determining an adjustment to a previously determined premium charged to the entity for the coverage.

5. The system of claim 1, wherein:
the computer processor is further configured to obtain a value for a characteristic of the entity seeking insurance based on information received via the first communication device; and
determining a rating category for the coverage further comprises applying the classification rule for each of the plurality of respective rating categories to the received entity characteristic value.

6. The system of claim 5, wherein the characteristic of the entity comprises one of age, driving history, driving score, gender, and line of business.

7. The system of claim 5, wherein obtaining an underwriting and pricing algorithm comprises:
identifying a first underwriting and pricing algorithm based on the received vehicle characteristic value; and
identifying a second underwriting and pricing algorithm based on the received entity characteristic value.

8. The system of claim 5, wherein obtaining an underwriting and pricing algorithm comprises identifying the underwriting and pricing algorithm based on the received vehicle characteristic value and the received entity characteristic value.

9. The system of claim 1, wherein:
the computer processor is further configured to obtain a value for a sensor data parameter based on information received via the second communication device; and determining a rating category for the coverage further comprises applying the classification rule for each of the plurality of respective rating categories to the received sensor data parameter value.

10. The system of claim 9, wherein obtaining a underwriting and pricing algorithm comprises:
identifying a first underwriting and pricing algorithm based on the received vehicle characteristic value; and
identifying a second underwriting and pricing algorithm based on the received sensor data parameter value.

11. The system of claim 9, wherein obtaining an underwriting and pricing algorithm comprises identifying the underwriting and pricing algorithm based on the received vehicle characteristic value and the received sensor data parameter value.

12. The system of claim 5, wherein:
the computer processor is further configured to obtain a value for a sensor data parameter based on information received via the second communication device; and
determining a rating category for the coverage further comprises applying the classification rule for each of the plurality of respective rating categories to the received sensor data parameter value.

13. The system of claim 1, wherein the received sensor data comprises at least one of: raw sensor data, aggregated sensor data, summary data indicative of raw sensor data.

14. The system of claim 1, wherein the received sensor data includes summary data indicative of raw sensor data.

15. A vehicle telematics data collection and analysis method, comprising:
receiving, with a first communication device, a request to insure a vehicle of an entity;
collecting data, while the vehicle is in operation, by one or more vehicle telematics sensors, comprising one or more of speedometers, odometers, braking sensors, air bag deployment sensors, location detectors, accelerometers, and steering monitors;
dynamically uploading vehicle telematics sensor data by a terminal executing an automated webservice application, the terminal comprising a remote communication device in communication with the one or more vehicle telematics sensors;
receiving, with a second communication device, from the terminal, vehicle telematics sensor data related to the vehicle, wherein the vehicle telematics sensor data includes at least one data parameter;
storing, in a memory, a plurality of rating categories, wherein each of the plurality of rating categories is associated with a classification rule and at least one of a plurality of underwriting and pricing algorithms, wherein the one of the plurality of underwriting and pricing algorithms associated with one of the plurality of rating categories and the at least one of the plurality of underwriting and pricing algorithms associated with another one of the plurality of rating categories apply different sets of data parameters or sensor data parameter weights;
generating, with a computer processor, a price for an insurance policy including coverage for the vehicle by:
obtaining a value for the characteristic of the vehicle based on information received via the first communication device, wherein the characteristic of the vehicle comprises one of vehicle size, vehicle safety rating, vehicle engine size, vehicle color, vehicle cargo capacity, and vehicle age,
determining a rating category from the plurality of stored rating categories for the coverage by applying, to the received vehicle characteristic value, the classification rule for each of the plurality of respective rating categories;
obtaining an underwriting and pricing algorithm of the plurality of underwriting and pricing algorithms, corresponding to the identified rating category for use in determining the price;
determining the price based at least in part by applying a set of sensor data parameter weights to the received vehicle telematics sensor data according to the obtained underwriting and pricing algorithm;
outputting, with an output device, the price based in part on the manipulation.

16. The method of claim 15, wherein:
the underwriting and pricing algorithm associated with a first of the rating categories applies a first set of data parameters from the received sensor data for use in generating the price; and
the underwriting and pricing algorithm associated with a second of the rating categories applies a second set of data parameters from the received sensor data for use in generating the price, wherein the second set of data parameters is at least partially different than the first set of data parameters.

17. The method of claim 15, wherein:
the underwriting and pricing algorithm associated with a first of the rating categories applies a first set of sensor data parameter weights; and
the underwriting and pricing algorithm associated with a second of the rating categories applies a second set of sensor data parameter weights, wherein the second set of sensor data parameter weights is at least partially different than the first set of sensor data parameter weights.

18. The method of claim 15, wherein determining the price comprises determining an adjustment to a previously determined premium charged to the entity for the coverage.

19. The method of claim 15, further comprising:
obtaining, with the computer processor, a value for a characteristic of the entity seeking insurance based on information received via the first communication device; and
wherein determining a rating category for the coverage further comprises applying, to the received entity characteristic value, the classification rule for each of the plurality of respective rating categories.

20. The method of claim 19, wherein the characteristic of the entity comprises one of age, driving history, driving score, gender, and line of business.

21. The method of claim 19, wherein obtaining a underwriting and pricing algorithm comprises:
identifying a first underwriting and pricing algorithm based on the received vehicle characteristic value; and
identifying a second underwriting and pricing algorithm based on the received entity characteristic value.

22. The method of claim 19, wherein obtaining an underwriting and pricing algorithm comprises identifying the underwriting and pricing algorithm based on the received vehicle characteristic value and the received entity characteristic value.

23. The method of claim 15, further comprising:
obtaining, with the computer processor, a value for a sensor data parameter based on information received via the second communication device; and
wherein determining a rating category for the coverage further comprises applying, to the received sensor data parameter value, the classification rule for each of the plurality of respective rating categories.

24. The method of claim 23, wherein obtaining a underwriting and pricing algorithm comprises:
identifying a first underwriting and pricing algorithm based on the received vehicle characteristic value; and
identifying a second underwriting and pricing algorithm based on the received sensor data parameter value.

25. The method of claim 23, wherein obtaining an underwriting and pricing comprises identifying the underwriting and pricing algorithm based on the received vehicle characteristic value and the received sensor data parameter value.

26. The method of claim 23, further comprising:
obtaining, with the computer processor, a value for a sensor data parameter based on information received via the second communication device; and
wherein determining a rating category for the coverage further comprises applying, to the received sensor data parameter value, the classification rule for each of the plurality of respective rating categories.

27. The method of claim 15, wherein the received sensor data comprises at least one of: raw sensor data, aggregated sensor data, summary data indicative of raw sensor data.

28. The method of claim 15, wherein the received sensor data includes summary data indicative of raw sensor data.

29. A telematics system, comprising:
one or more vehicle telematics sensors, comprising one or more of speedometers, odometers, braking sensors, air bag deployment sensors, location detectors, accelerometers, and steering monitors, collecting data while a vehicle is in operation;
a terminal comprising a remote communication device in communication with the one or more vehicle telematics sensors and storing computer-readable instructions defining an automated webservice application configured to dynamically upload vehicle telematics sensor data; and
non-transitory computer readable media encoding computer-readable instructions, which, when executed on a processor cause the processor to carry out a method comprising:
receiving a request to insure a vehicle of an entity;
receiving from the terminal vehicle telematics sensor data related to the vehicle, wherein the sensor data includes at least one data parameter;
storing a plurality of rating categories, wherein each of the plurality of rating categories is associated with a classification rule and at least one of a plurality of underwriting and pricing algorithms, wherein the at least one of the plurality of underwriting and sensor algorithms associated with one of the plurality of rating categories and the at least one of the plurality of underwriting and pricing algorithms associated with another one of the plurality of rating categories apply different sets of data parameters or sensor data parameter weights;
generating a price for an insurance policy including coverage for the vehicle by:
obtaining a value for the characteristic of the vehicle based on information received via the first communication device, wherein the characteristic of the vehicle comprises one of vehicle size, vehicle safety rating, vehicle engine size, vehicle color, vehicle cargo capacity, and vehicle age;
identifying a rating category from the plurality of stored rating categories for the coverage by comparing the received vehicle characteristic value to the classification rule for each of the plurality of respective rating categories;
obtaining an underwriting and pricing algorithm corresponding to the identified rating category for use in determining the price;
determining the price based at least in part by applying a set of sensor data parameter weights to the received vehicle telematics sensor data according to the obtained underwriting and pricing algorithm;
outputting the price based in part on the manipulation.

30. The system of claim 29, wherein:
the underwriting and pricing algorithm associated with a first of the rating categories applies a first set of data parameters from the received sensor data for use in generating the price; and
the underwriting and pricing algorithm associated with a second of the rating categories applies a second set of data parameters from the received sensor data for use in generating the price, wherein the second set of data parameters is at least partially different than the first set of data parameters.

31. The system of claim 29, wherein:
the underwriting and pricing algorithm associated with a first of the rating categories applies a first set of sensor data parameter weights; and
the underwriting and pricing algorithm associated with a second of the rating categories applies a second set of sensor data parameter weights, wherein the second set of sensor data parameter weights is at least partially different than the first set of sensor data parameter weights.

32. The system of claim 29, wherein determining the price comprises determining an adjustment to a previously determined premium charged to the entity for the coverage.

33. The system of claim 29, encoding computer readable instructions, which, when executed on the processor cause the processor to further:
obtain a value for a characteristic of the entity seeking insurance based on information received via the first communication device; and
wherein determining a rating category for the coverage further comprises applying, to the received entity characteristic value, the classification rule for each of the plurality of respective rating categories.

34. The system of claim 29, wherein the characteristic of the entity comprises one of age, driving history, driving score, gender, and line of business.

35. The system of claim 29, wherein obtaining a sensor data manipulation algorithm comprises:
identifying a first underwriting and pricing algorithm based on the received vehicle characteristic value; and
identifying a second underwriting and pricing algorithm based on the received entity characteristic value.

36. The system of claim 33, wherein obtaining an underwriting and pricing algorithm comprises identifying the underwriting and pricing algorithm based on the received vehicle characteristic value and the received entity characteristic value.

37. The system of claim 29, encoding computer readable instructions, which, when executed on the processor cause the processor to further:
obtain a value for a sensor data parameter based on information received via the second communication device; and
wherein determining a rating category for the coverage further comprises applying, to the received sensor data parameter value, the classification rule for each of the plurality of respective rating categories.

38. The system of claim 37, wherein obtaining a sensor data manipulation algorithm comprises:

identifying a first underwriting and pricing algorithm based on the received vehicle characteristic value; and identifying a second underwriting and pricing algorithm based on the received sensor data parameter value.

39. The system of claim 37, wherein obtaining an underwriting and pricing algorithm comprises identifying the sensor algorithm based on the received vehicle characteristic value and the received sensor data parameter value.

40. The system of claim 37, encoding computer readable instructions, which, when executed on the processor cause the processor to further:

obtain a value for a sensor data parameter based on information received via the second communication device; and wherein determining a rating category for the coverage further comprises comparing the received sensor data parameter value to the classification rule for each of the plurality of respective rating categories.

41. The system of claim 29, wherein the received sensor data comprises at least one of: raw sensor data, aggregated sensor data, summary data indicative of raw sensor data.

42. The system of claim 29, wherein the received sensor data includes summary data indicative of raw sensor data.

43. The system of claim 1, wherein the automated webservice application is configured to upload vehicle telematics sensor data in real time.

* * * * *